May 30, 1939.  W. R. HORSFIELD  2,160,101
APPARATUS FOR FEEDING ARTICLES IN SORTING AND LIKE MACHINES
Filed March 4, 1938  3 Sheets-Sheet 2

INVENTOR:
Walter Reginald Horsfield,
BY
Frank S. Ashuman,
ATTORNEY.

Patented May 30, 1939

2,160,101

UNITED STATES PATENT OFFICE 2,160,101

APPARATUS FOR FEEDING ARTICLES IN SORTING AND LIKE MACHINES

Walter Reginald Horsfield, Welwyn Garden City, England, assignor to Electric Selectors Limited, Welwyn Garden City, England, a British company Application March 4, 1938, Serial No. 194,010
In Great Britain March 10, 1937

4 Claims. (Cl. 221—130)

This invention relates to apparatus for feeding small similar articles such as seeds so that they are caused to travel in an end-to-end sequence. This mode of feeding is advantageous, for example, a machine for sorting articles according to their colour or albedo by means of a photo-electric cell, although the invention is not restricted to this particular application.

According to this invention the articles to be fed are supplied to a point near the centre of a disc rotating on a vertical axis, and above the disc is mounted a spiral of smooth material, similar in shape to a clock spring, with the lower edge of the spiral close to the upper surface of the disc. The disc is rotated in such a direction that the seeds or other articles, carried round by friction between them and the disc, are guided by the turns of the spiral so as to travel gradually outwards towards the periphery of the disc. As they move outwards their linear speed increases and they therefore tend to spread out and if fed at the right speed they become arranged in a single travelling row. At the same time they move across the surface of the disc in the radial direction and thereby tend to become similarly oriented. Thus, for example, spindle shaped articles such as rice grains tend to set themselves with their long dimension in the circumferential direction owing to lateral pressure against the smooth surface of the spiral guide.

The upper surface of the disc is preferably concave and so shaped that the force tending to urge the articles radially outwards is the same at all points. As is well known an upwardly concave paraboloid of revolution rotated at the appropriate speed has the property that an object placed on it experiences no force in the radial direction along the surface. If the critical speed is exceeded the object would experience a force acting outwardly but this would not be the same at all points. Preferably, according to this invention, the surface is given a shape resembling a frustum of a torus. It is derived from a paraboloid of a revolution but is modified by imposing on it at all points an equal outward slope. Thus, the resultant of centrifugal force and gravity acts at a constant angle to the surface of the disc at all points. Near the centre where the centrifugal force is slight the surface slopes downwards in the outward direction. This slope decreases gradually until the surface becomes momentarily horizontal and then it slopes upwards at a gradually increasing angle towards the periphery. The two halves of the generating parabola are, as it were, bent downwards about the vertex through the required angle and the speed of rotation is the critical speed of the unmodified paraboloid. In many cases a circular arc having its centre displaced from the axis of rotation is a sufficiently close approximation to the parabolic curve.

Referring to the accompanying drawings.

Figure 2:
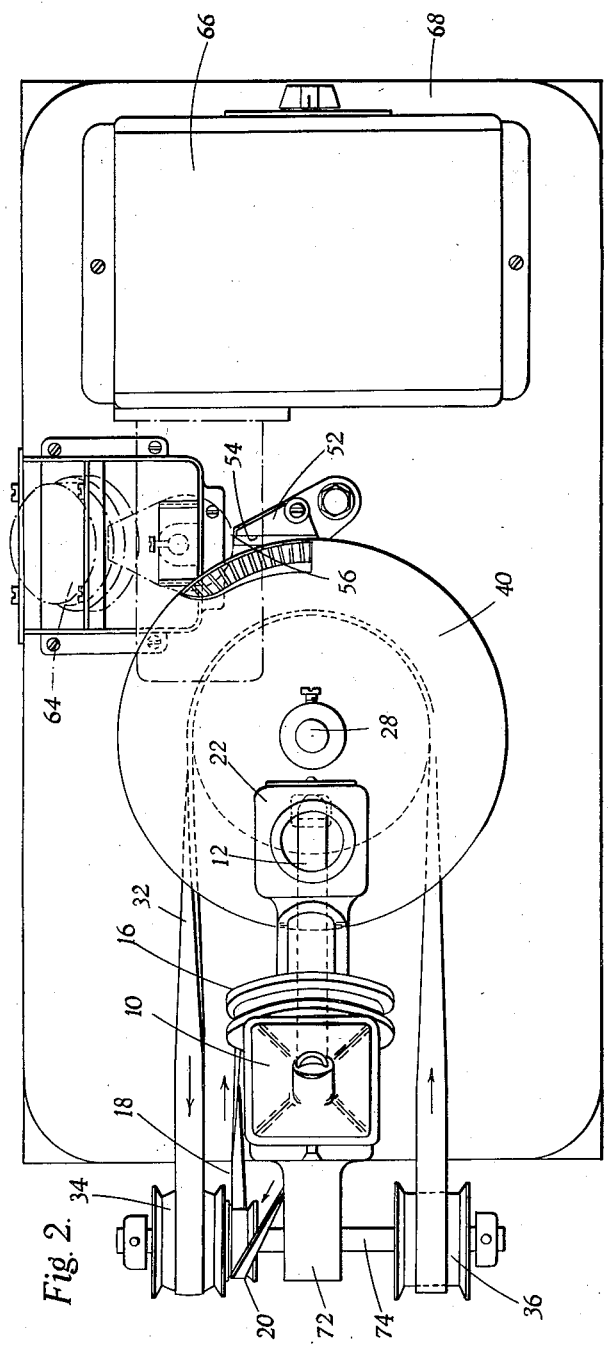
Figure 2 is a plan.

The apparatus illustrated is suitable for the feeding of seeds such as rice grains which are roughly spindle shaped. The seeds are fed continuously to a hopper 10 from which they pass to an inclined tube 12 mounted in bearings 14 and provided with a pulley 16 driven by a belt 18 from a pulley 20. The rotation of the tube 12 results in the grains being delivered smoothly and uniformly from the lower end of the tube, from which they fall down a chute 22 on to an inclined surface 24. The impact of the grains on this surface dislodges dirt and dust which may be adhering to them and this dust is removed by a current of air flowing upwards through the chute the upper end of which is connected to the inlet of a fan or blower (not shown). The grains then fall upon the surface of a disc 26 mounted to rotate upon a fixed vertical spindle 28. This disc is formed with a pulley 30 and is driven by a belt 32 passing over idler pulleys 34, 36 and downwards to a pulley on the shaft of an electric motor (not shown). The pulley 20 previously mentioned is integral with the pulley 34 as shown in Figure 2.

The upper surface of the disc is a surface of revolution so shaped that the angle between the resultant of centrifugal force and gravity at any point, and the normal to the surface at that point, is constant or nearly constant so that objects placed on it experience a force, acting outwardly, which is the same or nearly the same at all radial distances. To obtain this effect the generating curve should be a parabola the two halves of which on either side of its vertex are "bent" away from one another. Regarding the generating curve as one half of a parabola, its vertex is on the axis of rotation and its geometrical axis, instead of being coincident with the axis of rotation as in the case, for example, of a parabolic reflector, is inclined thereto on the same side of the axis of rotation as the curve itself. In practice a sufficiently close approximation is obtained by replacing the parabolic curve by a circular arc.

Figure 3:
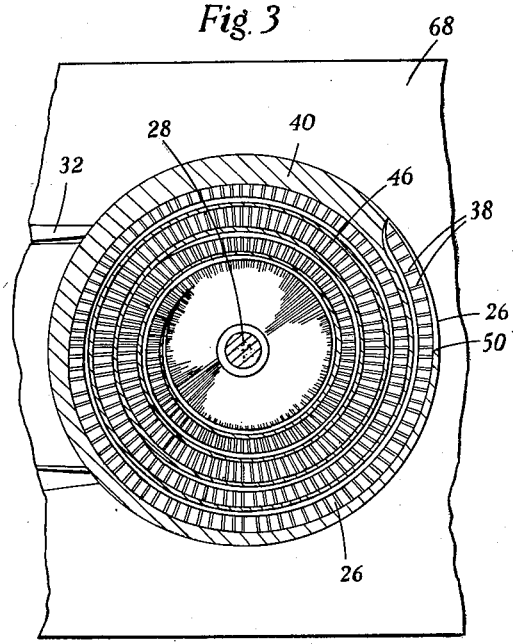
Figure 3 is a plan in section on the line III—III in Figure 1.
Figure 4:
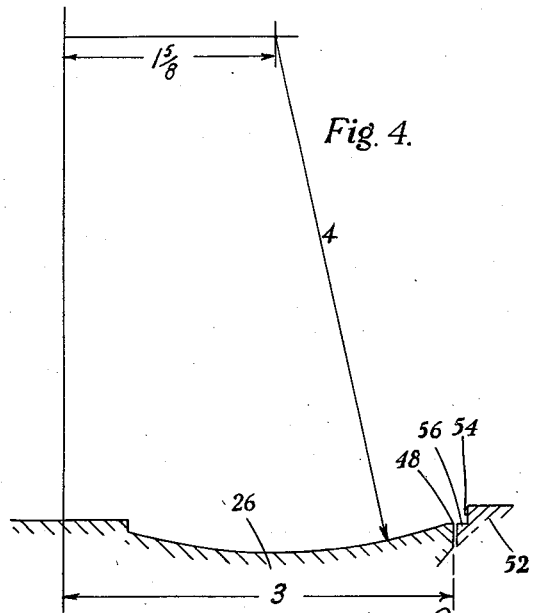
Figure 4 is an explanatory diagram.

As an example, when the disc is 6 inches in diameter and the speed of rotation is 156 R. P. M. the circular arc is 4 inches radius and the centre is displaced 1⅝ inches from the axis of rotation. This generating curve is represented in Figure 4. The curved surface of the disc is formed with closely spaced narrow radial grooves 38 as shown in Figure 3. Alternatively, the surface may be roughened as for example by grinding or the upper part of the disc may be formed of a body of granular material such as emery held together by a resinous or other binding agent.

Figure 1:
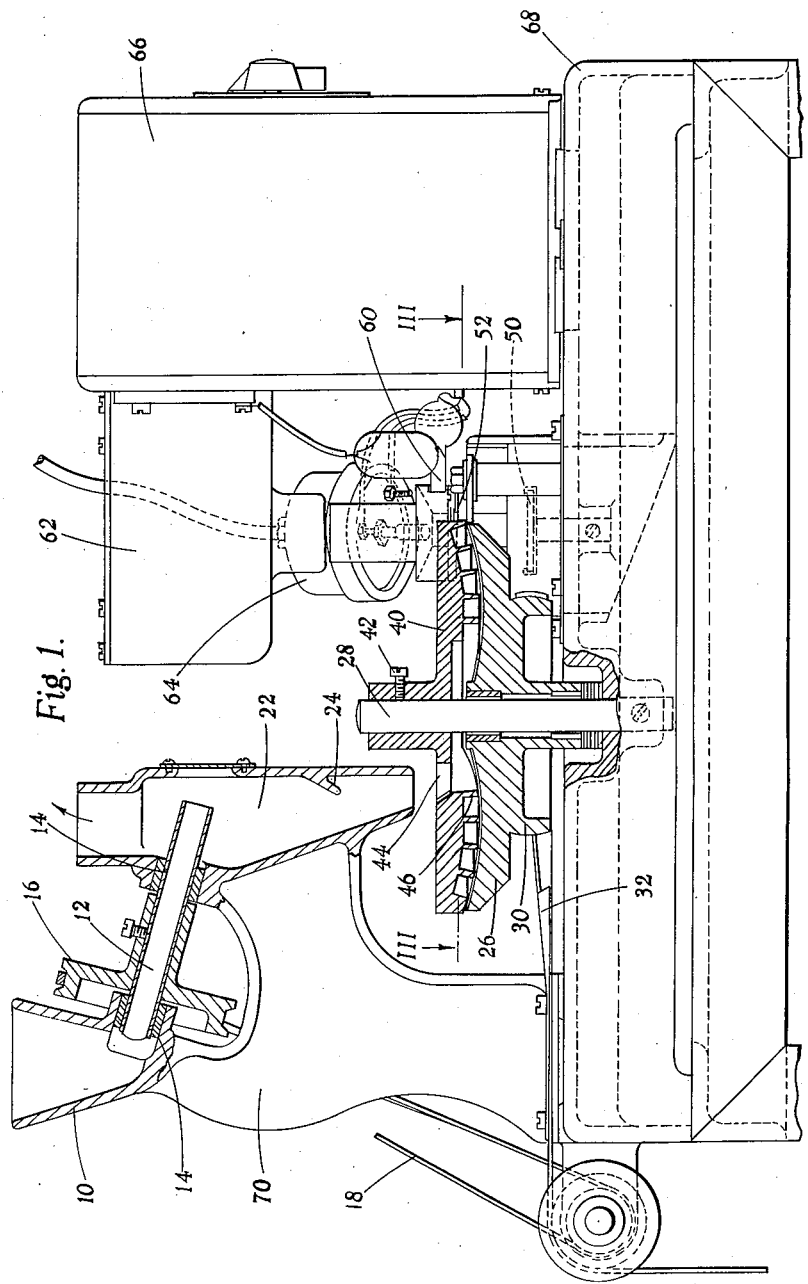
Figure 1 is a side elevation of an improved feeding device according to this invention with parts in section.

Above the disc 26 is mounted a cover-plate 40 secured to the spindle 28 by a set-screw 42 and formed with a hole 44 for the passage of the grains. This cover-plate 40 is formed on its lower surface with a spiral rib 46. The spiral has constant pitch and comprises approximately four and one-half complete turns. This rib somewhat resembles a clock spring but as shown in Figure 1 it is everywhere normal to the curved surface of the disc 26. The cover-plate is adjusted so that the lower edge of the rib is close to but not in contact with the surface of the disc. The inner surface of the rib is made as smooth as possible.

The grains are fed to the disc at a point just inside the inner end of the spiral rib and the speed at which they are fed is such that they are heaped up on the disc at this point. They are carried round with the disc and at the same time roll outwards towards the spiral rib, along which they slide. As they proceed along this rib their linear speed increases and they thin out, as it were, in consequence. At the same time they tend to arrange themselves lengthwise in the direction of travel along the rib because as they roll outwards over the grooved or roughened surface of the disc in consequence of the gradual outward retreat of the rib, they tend to set themselves with their long dimensions perpendicular to the direction of rolling. The rate of feed from the tube 12 is so adjusted that when the grains reach the end of the spiral they are separated by appreciable intervals, of the order of the length of a grain. The marginal zone of the disc 26 is flat as indicated at 48, Figure 4, the width of this flat zone being about one-sixteenth of an inch.

Mounted at the side of the disc near the outer end 50 of the spiral rib is a guide-plate 52. This guide-plate has a vertical surface 54 which is tangential to a circle of slightly greater radius than the radius of the disc 26, and a horizontal surface 56 which is level with the flat margin or zone 48. As each grain arrives at the outer end 50 of the spiral rib it has a slight outward acceleration. It therefore strikes against the vertical surface 54 and is projected by its momentum along the horizontal surface 56 and leaves the guide-plate in a direction which is a continuation of the line of intersection of the surfaces 54 and 56. Just after leaving the guide-plate the grains pass between a background surface 58 and a mercury vapour lamp 60 and each grain is scanned by a photo-electric cell housed in a casing 62. A pneumatic rejecting mechanism indicated at 64 is arranged to reject dark or discoloured grains in the manner described in the specification of my co-pending application, Serial No. 194,009.

The casing 62 is supported on another casing 66 containing an amplifier. This casing is supported on a base-plate 68 which also supports the vertical spindle 28, a standard 70 for the hopper 10, the bearings 14 and the chute 22. This base-plate is provided with a lug 72 supporting a spindle 74 on which the pulleys 34, 36 rotate.

The angle to which the parabolic generating curve is tilted is determined by the coefficient of rolling friction and the rice grains on the surface of the disc 26. The particular curvature of this surface described above has been found to give the best results when the disc is of brass and the surface is radially grooved as shown, but this particular curvature is not the essence of the invention; a less certain but nevertheless adequate result may in some cases be secured with a flat plate or one having concave spherical curvature.

I claim:

1. Apparatus for feeding small articles such as seeds comprising in combination a disc rotating on a vertical axis, the upper surface of said disc being a surface of revolution the generatrix of which approximates to one half of a parabolic curve having its vertex on the axis of rotation and its geometrical axis inclined to the axis of rotation on the same side thereof as the said curve, means for supplying articles to said disc at a point near its centre and a spiral of smooth material resembling a clock spring mounted above the disc with its lower edge close to the upper surface of the disc, the direction of rotation of the disc being such that the articles carried round by friction between them and the disc, are guided by the turns of the spiral so as to travel gradually outwards towards the periphery of the disc.

2. Apparatus for feeding small articles such as seeds comprising in combination a disc rotating on a vertical axis the upper surface of said disc being a surface of revolution the generatrix of which is a circular arc having its centre displaced from the axis of rotation of the disc, means for supplying articles to said disc at a point near its centre and a spiral of smooth material resembling a clock spring mounted above the disc with its lower edge close to the upper surface of the disc, the direction of rotation of the disc being such that the articles carried round by friction between them and the disc, are guided by the turns of the spiral so as to travel gradually outwards towards the periphery of the disc.

3. Apparatus for feeding small articles such as seeds comprising in combination a disc rotating on a vertical axis, and having its upper surface of concave toric shape, means for supplying said articles to the disc at a point near its centre, a stationary coverplate surmounting said disc and formed on its lower surface with a spiral rib the lower edge of which is close to the upper surface of the disc, the direction of rotation of the disc being such that the point of intersection of a radius of the disc and the spiral rib moves outwards across the disc.

4. Apparatus according to claim 3 wherein the spiral rib is everywhere normal to the curved upper surface of the disc.

WALTER REGINALD HORSFIELD.